Dec. 18, 1951     T. J. DUNAWAY     2,578,994
METERING DEVICE

Filed Nov. 19, 1948     2 SHEETS—SHEET 1

INVENTOR
THOMAS J. DUNAWAY
BY
*Mason Graham*
ATTORNEYS

Dec. 18, 1951  T. J. DUNAWAY  2,578,994
METERING DEVICE
Filed Nov. 19, 1948  2 SHEETS—SHEET 2

INVENTOR
THOMAS J. DUNAWAY
BY
ATTORNEYS

Patented Dec. 18, 1951

2,578,994

UNITED STATES PATENT OFFICE 2,578,994

METERING DEVICE

Thomas J. Dunaway, Yucaipa, Calif.

Application November 19, 1948, Serial No. 61,095

4 Claims. (Cl. 222—133)

This invention has to do with metering and admixing devices.

While my device is advantageously usable for other purposes, I have found one of its principal advantages to be in its use for injecting an accurately metered amount of moisture and detergent into cleaning solvents contained in the cleaning chamber of a dry cleaning unit; and to enable those in the art to have a clear understanding of the invention I shall hereinafter describe it in its adaptation for that use. I wish it understood, however, that my invention is suitable and intended for use wherever accurate metering of a medium is desired, and particularly wherever it is desired to admix a definitely measured amount of some ingredient in a fluid line.

For instance, in dry cleaning plants the practice is to place clothes to be cleaned in the cleaning tank or chamber, admit the desired cleaning solvent, and after tumbling the clothes in the solvent for some time the solvent is drained off, to withdraw the readily removable dirt, and is then replaced in the tank. These cycles of tumbling and withdrawing of solvent may typically take place several times. Then as a final step, to remove stains, spots, etc., it has been the practice to inject steam into the tank, the steam passing through a valve which admits a detergent into the line directly from a reservoir. The difficulty of this practice has been that no definitely metered quantity of detergent or moisture is obtained, which frequently proves injurious to clothes being cleaned. At best, only an approximate amount of detergent may be determined and the same is true of the moisture, because the amount of both depends upon the steam pressure.

It is an object of my invention to provide a metering and admixing device which enables a fully accurate determination of the mixture admitted, as well as a fully accurate measurement of the quantity of detergent injected.

A further object is to provide accurate metering of any medium under any working conditions, such as substantial variations in the pressure in the injecting fluid line.

Another object is to provide a unit of this character, wherein a medium such as a detergent is contained in a relatively large storage reservoir, and is passed therefrom into a relatively small metering chamber, from which it may be withdrawn by vacuum into a fluid line, or may be discharged in any other manner. In either event, in accordance with my invention, before being finally discharged, the medium must pass from the reservoir into a metering chamber.

Another object is to provide in such a device automatic means for insuring that the outlet from the reservoir to the metering chamber is sealed simultaneously with the opening of the outlet from the metering chamber.

Another object is to provide in such a device means for agitating the medium in the reservoir.

A further object is to provide a unit of this character which may be rendered fully automatic in its operation.

Still further objects and corresponding advantages will appear from the following detailed description of a presently preferred adaptation of the invention in the environment above related, for which purpose I shall refer to the accompanying drawings, wherein.

Figure 1:
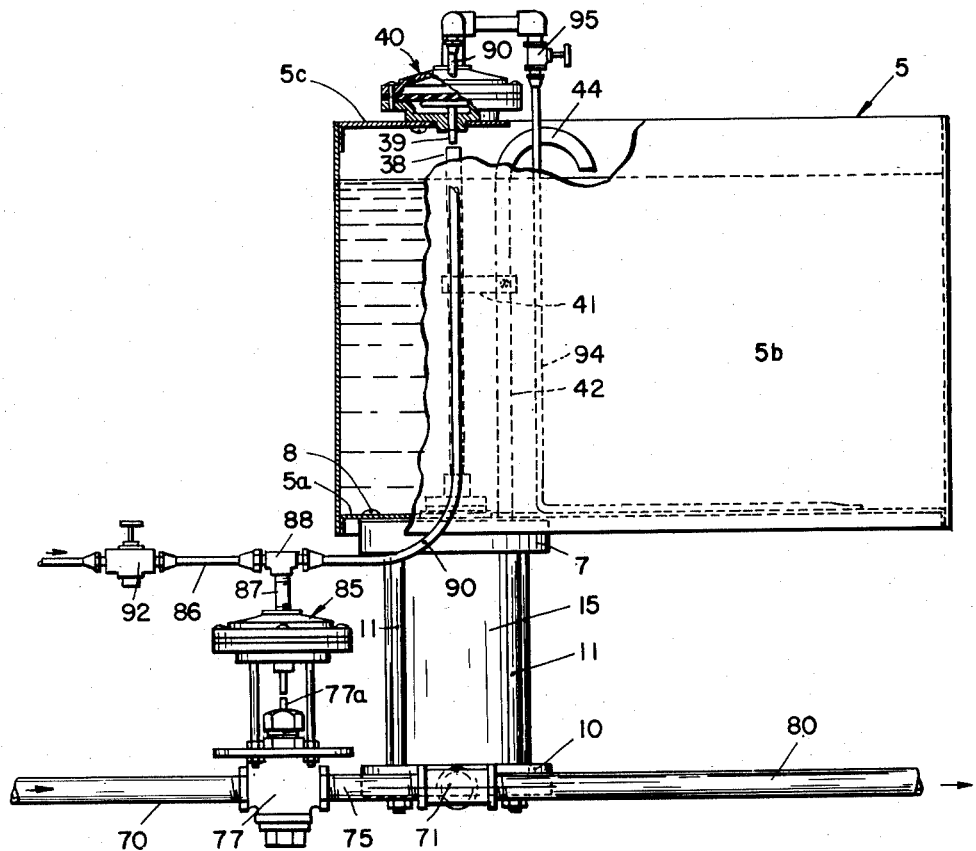
Fig. 1 is a side elevation with some parts being shown in section.

Referring now to the drawings, I show a reservoir or tank 5, having a bottom wall 5a, side walls 5b, and a partial top cover 5c. The top may be completely covered if desired so long as the cover does not completely seal the reservoir from atmosphere in a way to create a vacuum therein. A plate 7 is secured to the bottom wall of the tank, as by screws 8 and a lower plate 10 is suspended from housing 7 as by bolts 11. A sleeve 15 is interposed between the plates 7 and 10, having its ends fitted into annular recesses 17, 18 in the respective plates. Packing rings 19 may be interposed between the ends of the sleeve and the bottoms of the recesses to provide a fluid tight seal.

The sleeve, together with the plates, constitutes a metering container defining a metering chamber C, into which liquid from the tank 5 may pass by gravity flow through holes 20 provided in plate 7. An annular valve seat 22 is formed on the top surface of plate 7 around the inlet end of the openings 20.

In the plate 10, a radial outlet passageway 25 is formed, connecting at its inlet end with a chamber 27, which chamber in turn communicates with chamber C through valve controlled openings 28 and radial openings 29 formed in a push-rod guide 30, secured to the housing as by screws 32.

Openings 20 are controlled by a valve 35, having a seat engaging gasket 36, the valve being operated by a push-rod 38, whose top end is disposed to be engaged by the stem 39 of a conventional diaphragm valve 40. The rod 38 slidably extends through a guiding bracket 41 secured to the tank 5.

A vent tube 42 is fitted into an opening 43 through plate 7 and preferably terminates in a hooked portion 44 above the liquid level in the reservoir, although of course it may extend through the reservoir to communicate with atmosphere exteriorly of the reservoir, if desired.

Openings 28 are controlled by a valve 50 carrying a seating gasket 51 disposed to seat against annular seat 53 around the openings. The valve 53 has a boss 54 extending through an axial opening through the plate 10 to be engaged by the lower end of a push-rod 57 slidably extending through guide 30 and through an axial opening in the upper plate 7, being fixed at its top end to the valve 35 as by a cross-pin 58, whereby to move with valve 35.

The lower end of chamber 27 is closed by a cap 60 housing a coil spring 62, which urges valve 50 upwardly into engagement with its seat. The cap is held on the housing by screws 63, or in any other suitable manner.

For withdrawing liquid from the chamber 27, I provide a fluid line generally denoted 70, comprising a T 71 providing a mixing chamber 72 into which the nipple 73 extends to form a venturi. The inlet end of the nipple communicates with a conduit 75, communicating through a conventional control valve 77 with line 70. Line 70 leads from a source 76 of compressed air or other fluid. An outlet pipe 80 leads from the chamber 72 and discharges, for instance, into a dry cleaning or washing machine, not shown. An inlet tube 82 communicates with the chamber 27 through passageway 25.

For actuating the stem 77a of valve 77, I provide a conventional diaphragm valve 85, communicating preferably with an independent air line 86 through a conduit 87. Line 86 leads from a source 86a of air under pressure, through the T 88 connecting with conduit 87, and also through a conduit 90, with the diaphragm valve 40.

A control valve 92 controls the lines 86—90.

Figure 2:
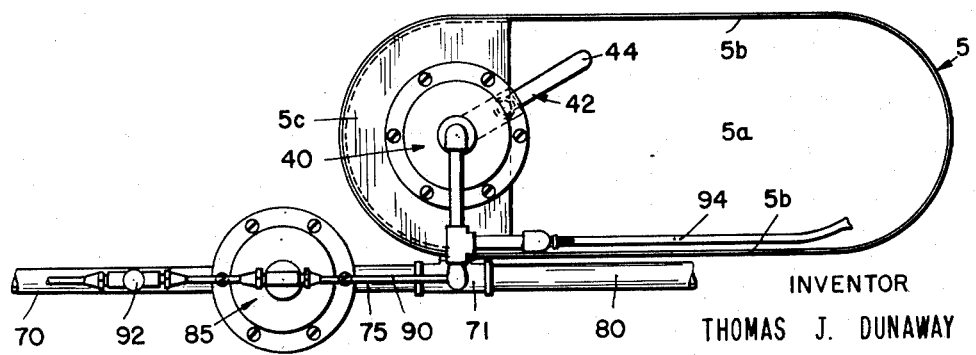
Fig. 2 is a top plan view.

To agitate the liquid in reservoir 5, I prefer to provide a tube 94 which is connected at its inlet with the air line 90 through the valve 40 and discharges tangentially in the curved side portion of the reservoir adjacent the bottom, as best shown in Figs. 1 and 2. Tube 94 may be controlled by a throttle valve 95.

The parts are illustrated in the position which they occupy when the air line 70 is closed, said line being closed by an actuating spring 96 in valve 77. The valve 50 is also closed by spring 62, preventing passage of liquid from the metering chamber C into chamber 27, although valve 35 is open to permit liquid from the tank 5 to flow by gravity through openings 20 into the metering chamber. Valve 35 is automatically opened by virtue of push-rod 57 when valve 50 closes. Fluid will thus flow into chamber C until said chamber is completely filled with a pre-determined charge of liquid. For instance, in the particular adaptation which I am describing, the liquid would be a soap or detergent. In this position of the parts, the valve 92 is also closed.

When it is desired to inject a mixed charge of air and detergent into the dry cleaning or washing machine, not shown, the operator simply opens valve 92, which operates diaphragm valves 40, 85, to in turn open valve 77 and close valve 35. By opening valve 77 the air siphons the detergent into chamber 72 from chamber C, through chamber 27, and discharges it through line 80 until the metering chamber C is empty.

Preferably the sleeve 15 is of glass or other transparent material to enable the operator to observe when it is empty or full, although this is not absolutely necessary, since the operator would be able to determine when it is full by the position of the valves, and he would be able to determine when it has become emptied, by sound emanating from the intake end of the vent tube.

It will be observed, therefore, that regardless of the fluid pressure in lines 70, the amount of liquid admitted into that line is always accurately metered, since the quantity cannot be greater than the capacity of chamber C.

Moreover, by using compressed air as the injecting medium, instead of steam, the operator may definitely control the amount of moisture injected into the dry cleaning tank.

It will be apparent that important safety features result from the arrangement described. For instance, during the time that the fluid line 70 is open, the pressure in line 86 which operates valve 77 to open line 75, also acts, through valve 40, to maintain valve 35 closed, and closure of valve 35 operates automatically to open valve 50 against its spring 62. Thus, when line 86 is open, it is impossible to open valve 35 to place the air line in communication with the reservoir through valves 50 and 35, so that only the accurately metered quantity in chamber C may pass into the air line.

While I have described apparatus in conjunction with an air line, it will be understood of course that the chamber 27 may be discharged into any other fluid line if desired, or it may be discharged directly into another tank with which the contents of the chamber C are to be admixed.

Figure 6:
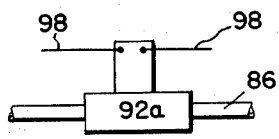
Fig. 6 is a fragmentary elevation showing a modification.
Figure 3:
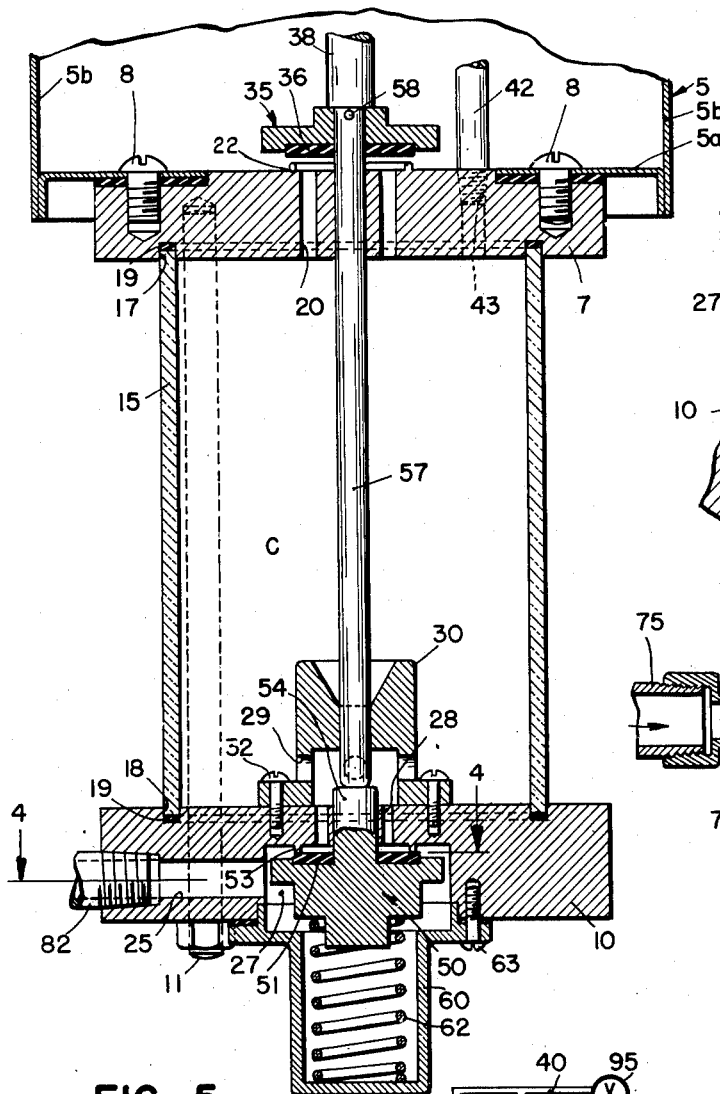
Fig. 3 is an enlarged medial section of the metering chamber and controlling valves.
Figure 4:
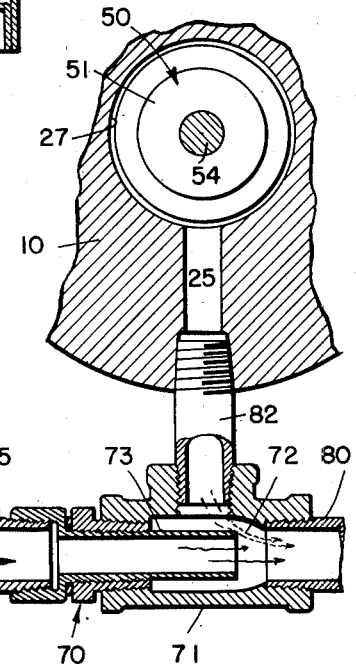
Fig. 4 is a section taken on line 4—4 of Fig. 3.
Figure 5:
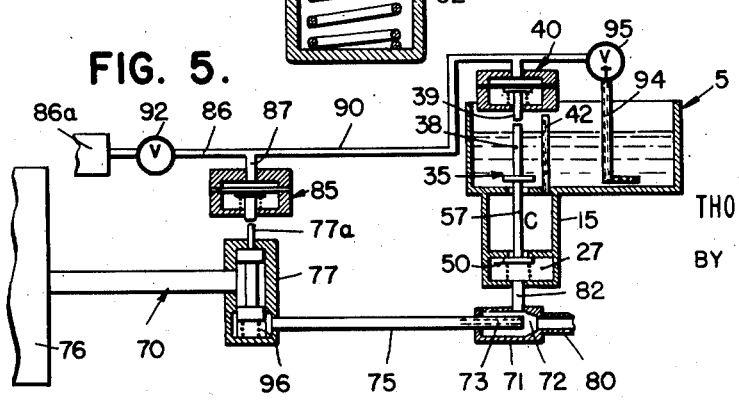
Fig. 5 is a flow diagram.

In lieu of manually actuated control valve 92 I may substitute, for instance, a conventional solenoid actuated valve 92a, as shown in Fig. 6, having circuit wires 98.

I claim:

1. In a liquid metering device for dispensing a measured quantity of liquid into a fluid line, a liquid reservoir having an outlet below the liquid level therein, a valve controlling the outlet, a metering container of less capacity than the reservoir mounted in communication with the outlet to receive liquid by gravity flow therethrough, the container having an outlet opening, a valve controlling the outlet opening, wall means providing a chamber communicating with said outlet opening, a fluid line opening into and discharging from the latter chamber, and a valve controlling the fluid line and fluid operated actuating means for said respective valves, said latter means being operative simultaneously to open the last two mentioned valves and close the first mentioned valve and vice versa.

2. In a metering device, a reservoir having an outlet opening in its bottom portion, whereby material in the reservoir may flow through the opening by gravity, a valve controlling the opening, a metering container disposed in communication with the opening, the container having an outlet opening, a valve controlling the latter opening, fluid actuated means operable to close the first mentioned valve, a line for supplying fluid under pressure to the fluid actuated means, independent actuating means operable to close the last mentioned valve, means operable in response to closing movement of each of the valves to open the other valve, and a fluid line communicating at its inlet with the first named line and discharging into the reservoir whereby to discharge fluid into the reservoir to agitate the contents thereof.

3. In a metering device, a reservoir having an outlet in its bottom, a vertically movable valve for controlling said outlet, a metering container below the tank and having its top end in communication with said outlet, an outlet opening in the bottom of the container, a vertically movable valve controlling the latter outlet opening, spring means urging the latter valve upwardly into closed position, a push rod extending from one of said valves to the other, said rod being connected to the first named valve and engageable with but unconnected to the last named valve, a guide in the container for the rod, and actuating means for moving the first named valve downwardly into closed position, said rod functioning in response to closing movement of each valve to open the other.

4. In a fluid metering system, the combination of a first fluid pressure line, a second fluid pressure line, a liquid reservoir, a liquid reservoir metering container in gravity flow communication with the reservoir, means providing a fluid mixing chamber in communication with the container, a normally open valve controlling communication from the reservoir to the container, a normally closed spring loaded valve controlling communication from the container to the mixing chamber, a diaphragm operably connected with the first mentioned valve and in controlled communication with the first fluid line, means operable in response to closing movement of the first mentioned valve to open the second mentioned valve, and second diaphragm means, in communication with the first fluid line, operable to open the second fluid line to the mixing chamber when the first mixing valve is closed.

THOMAS J. DUNAWAY.

REFERENCES CITED

The following references are of record in the file of this patent:

UNITED STATES PATENTS

| Number | Name | Date |
| --- | --- | --- |
| 43,344 | Schrink | June 28, 1864 |
| 624,208 | Haye | May 2, 1899 |
| 1,257,816 | Cunnyngham | Feb. 26, 1918 |
| 1,499,468 | McCoy | July 1, 1924 |
| 2,203,054 | Holmes | June 4, 1940 |
| 2,522,898 | Sanborn | Sept. 19, 1950 |